United States Patent
Farrar et al.

(10) Patent No.: US 8,517,142 B1
(45) Date of Patent: Aug. 27, 2013

(54) POWER STEERING UNIT AND FRAME ASSEMBLY FOR SUPPORTING STEERING UNIT

(75) Inventors: L. Tyler Farrar, Marysville, OH (US);
Jason A. Sovern, Marysville, OH (US);
Hiroaki Tomita, Shiki Saitama (JP);
Bunzo Seki, Dublin, OH (US);
Hiromitsu Shiina, Dublin, OH (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 13/600,367

(22) Filed: Aug. 31, 2012

(51) Int. Cl.
*B62D 5/04* (2006.01)

(52) U.S. Cl.
CPC .................. *B62D 5/0409* (2013.01)
USPC ....................................... 180/444

(58) Field of Classification Search
USPC ............... 180/426, 427, 430, 438, 439, 440, 180/444
IPC ....................................... B62D 5/0409, 5/0448
See application file for complete search history.

(56) References Cited

U.S. PATENT DOCUMENTS

| | | | |
|---|---|---|---|
| 7,182,169 B2 | 2/2007 | Suzuki | |
| 7,665,571 B2 | 2/2010 | Kobayashi | |
| 7,775,318 B2 | 8/2010 | Okada et al. | |
| 8,122,993 B2* | 2/2012 | Ripley et al. | 180/233 |
| 2008/0053743 A1* | 3/2008 | Tomita | 180/443 |
| 2011/0239787 A1 | 10/2011 | Kato et al. | |

\* cited by examiner

*Primary Examiner* — J. Allen Shriver, II
*Assistant Examiner* — Felicia L Brittman
(74) *Attorney, Agent, or Firm* — Ulmer & Berne LLP

(57) ABSTRACT

A steering unit includes a housing, a steering shaft, a bearing, a steering arm, and a stop portion. The housing includes upper and lower portions that cooperate to define an interior. The steering shaft includes an upper and lower end. The bearing is supported by the lower portion of the housing and is disposed at least partially within the interior. The steering shaft is journaled with respect to the lower portion of the housing by the bearing. The steering arm is coupled with the lower end of the steering shaft and is configured for coupling to steerable wheels. The stop portion projects from the lower portion of the housing and into a travel path of the steering arm such that the steering arm selectively contacts the stop portion to prevent over-rotation of the steering shaft. A vehicular frame assembly for supporting the steering unit is also provided.

11 Claims, 7 Drawing Sheets

POWER STEERING UNIT AND FRAME ASSEMBLY FOR SUPPORTING STEERING UNIT

TECHNICAL FIELD

A frame of a vehicle includes a frame assembly configured for supporting a steering unit. The steering unit is coupled to the frame assembly and includes a housing that defines a stop portion configured for selective contact with a steering arm.

BACKGROUND

A power steering unit is provided on a vehicle for powered assistance with steering of the vehicle. The power steering unit includes a steering shaft. The power steering unit is supported by a frame of the vehicle and the steering shaft is rotatably supported by a bearing that is pressed into, and supported by, a portion of the frame. The frame includes a stop portion located beneath the bearing. A steering arm is mounted to the steering shaft and is configured for selective contact with the stop portion to prevent over-rotation of the steering shaft.

SUMMARY

In accordance with one embodiment, a steering unit comprises a housing, a steering shaft, a bearing, a steering arm, and a stop portion. The housing includes an upper portion and a lower portion that cooperate to define an interior. The steering shaft has an upper end and a lower end and extends into the interior of the housing. The bearing is supported by the lower portion of the housing and is disposed at least partially within the interior of the housing. The steering shaft is journaled with respect to the lower portion of the housing by the bearing such that the steering shaft is rotatable with respect to the housing. The steering arm is coupled with the lower end of the steering shaft and is configured for coupling to steerable wheels. The steering arm is movable along a travel path. The stop portion projects from the lower portion of the housing and into the travel path of the steering arm such that the steering arm selectively contacts the stop portion to prevent over-rotation of the steering shaft.

In accordance with another embodiment, a vehicular frame assembly comprises a left lower frame member, a right lower frame member, a left upright frame member, a right upright frame member, a lateral rib member, a left bracket member, and a right bracket member. The left lower frame member extends in a substantially longitudinal direction. The right lower frame member is spaced from the left lower frame member and extends in a substantially longitudinal direction. The left upright frame member is attached to and extends upwardly from the left lower frame member. The right upright frame member is attached to and extends upwardly from the right lower frame member. The lateral rib member is coupled to and extends between the left upright frame member and the right upright frame member. The lateral rib member defines at least one front mounting aperture configured for receipt of a fastener that facilitates releasable coupling of a steering unit to the lateral rib member. The front mounting aperture defines a first centerline. The left bracket member extends from the left lower frame member and defines a left mounting aperture that defines a second centerline. The right bracket member extends from the right lower frame member and is spaced from the left bracket member. The right bracket member defines a right mounting aperture that defines a third centerline. The first centerline is substantially perpendicular to at least one of the second centerline and the third centerline.

In accordance with yet another embodiment, a vehicle comprises a frame assembly, steerable wheels, and a steering unit. The steerable wheels are rotatably coupled to the frame assembly. The steering unit is coupled with the frame assembly. The steering unit comprises a housing, a steering shaft, a bearing, a steering arm, and a stop portion. The housing includes an upper portion and a lower portion that cooperate to define an interior. The steering shaft has an upper end and a lower end and extends into the interior of the housing. The bearing is supported by the lower portion of the housing and is disposed at least partially within the interior of the housing. The steering shaft is journaled with respect to the lower portion of the housing by the bearing such that the steering shaft is rotatable with respect to the housing. The steering arm is coupled with the lower end of the steering shaft and is configured for coupling to the steerable wheels. The steering arm is movable along a travel path. The stop portion projects from the lower portion of the housing and into the travel path of the steering arm such that the steering arm selectively contacts the stop portion to prevent over-rotation of the steering shaft.

BRIEF DESCRIPTION OF THE DRAWINGS

Various embodiments will become better understood with regard to the following description, appended claims, and accompanying drawings wherein:

DETAILED DESCRIPTION

Figure 1:
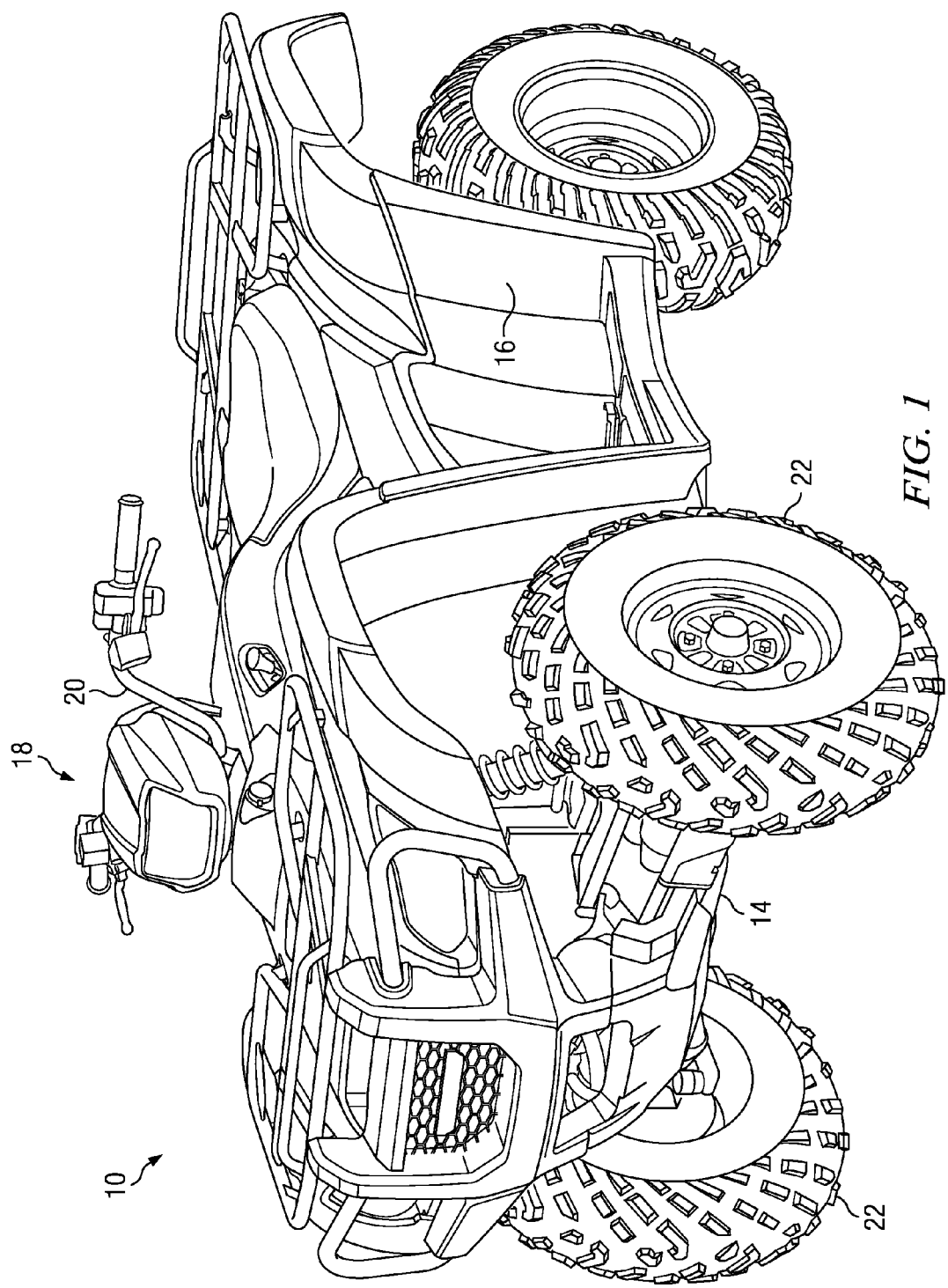
FIG. 1 is a front perspective view depicting a vehicle in accordance with one embodiment.

The present invention and its operation are hereinafter described in detail in connection with the views and examples of FIGS. 1-6, wherein like numbers indicate the same or corresponding elements throughout the views. A vehicle 10 can include a steering unit in accordance with one embodiment. As illustrated in FIG. 1, the vehicle 10 can be an all terrain vehicle (ATV), but in other embodiments, the vehicle 10 can be another type of saddle-type vehicle, or an automobile or other recreational vehicle or utility vehicle, for example. The vehicle 10 can include a frame 14 that is shown to have a tubular construction. The frame 14, however, can be provided in any of a variety of other suitable arrangements, such as in a unibody construction, for example, and can be formed using any of a variety of materials, such as metal or carbon fiber, for example. The frame 14 can support a body 16 which in some embodiments can include a variety of decorative panels.

Figure 2:
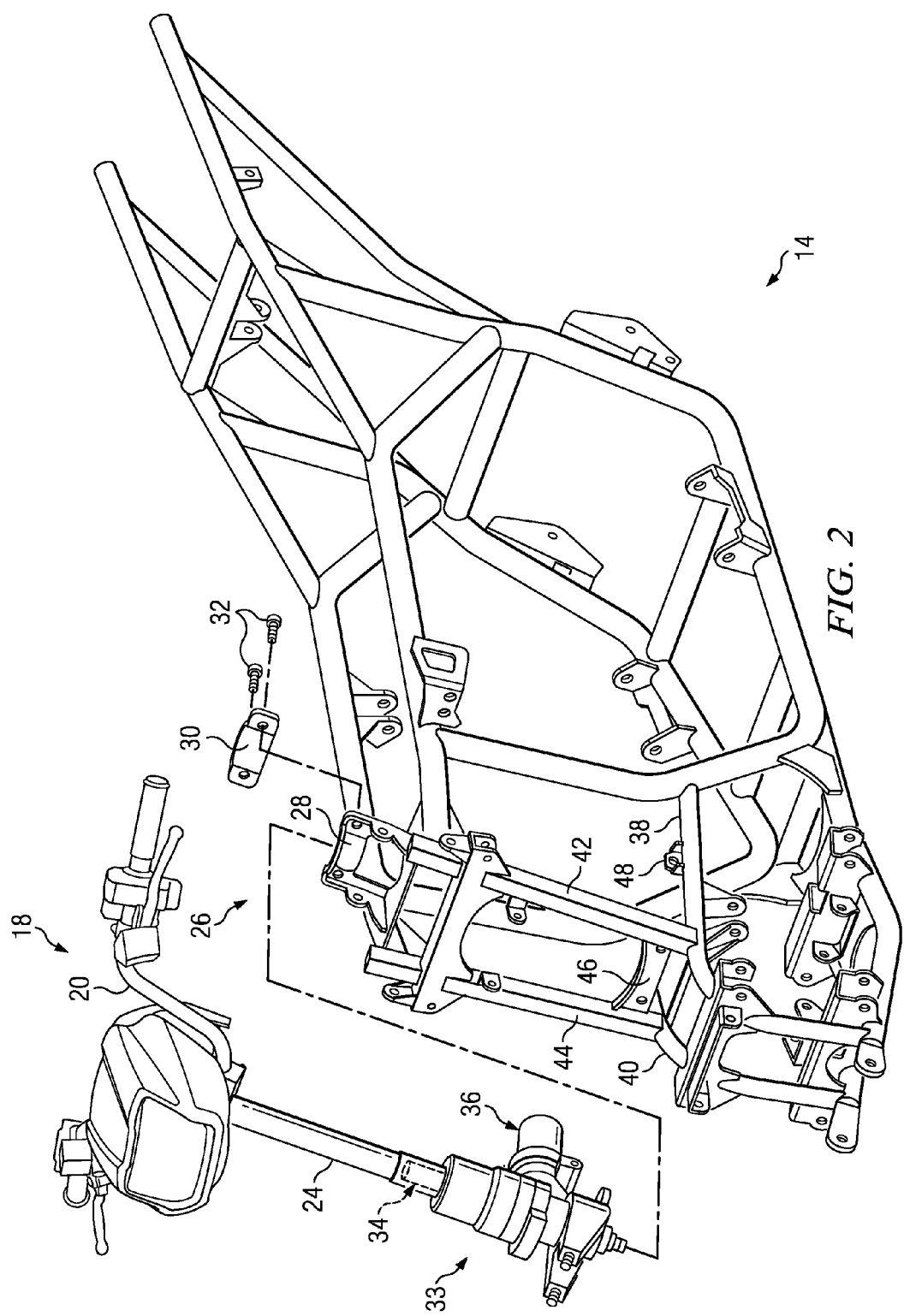
FIG. 2 is a front perspective view depicting a frame assembly and a steering assembly in connection with various other components of the vehicle of FIG. 1.

The vehicle 10 can include a steering assembly 18 that includes a set of handlebars 20 coupled with front wheels 22 and configured to facilitate steering of the front wheels 22. As illustrated in FIG. 2, the handlebars 20 can be coupled with a support shaft 24. The frame 14 can include a head tube 26 having a main portion 28 and a bracket portion 30. The bracket portion 30 can be releasably secured to the main portion 28 with bolts 32. The support shaft 24 can be releasably supported between the main portion 28 and the bracket portion 30 to facilitate pivoting of the support shaft 24 with respect to the frame 14.

The steering assembly 18 can include a steering unit that is configured to link the front wheels 22 to the support shaft 24. In one embodiment, as illustrated in FIG. 2, the steering unit can be an electronic power steering (EPS) unit 33 that provides assistive power for steering the front wheels 22. The EPS unit 33 can include a steering shaft 34 that is coupled to the support shaft 24 such as with a linchpin, a splined collar, or the like. The EPS unit 33 can also include an electric motor 36 (e.g., a power unit) that is associated with the steering shaft 34 and can selectively impart assistive torque to the steering shaft 34 during pivoting of the handlebars 20. The electric motor 36 can be powered from an on-board vehicular power system (e.g., a battery) and a vehicular controller (not shown), such as an electronic control unit (ECU) or a powertrain control module (PCM), can facilitate control of the electric motor 36. In particular, the vehicular controller can detect movement of the handlebars 20 (e.g., with a rotary encoder) and can operate the electric motor 36 to provide appropriate assistive torque to the steering shaft 34 during pivoting of the handlebars 20.

It will be appreciated that any of a variety of other suitable alternative power steering units are contemplated. For example, the vehicle 10 can include a hydraulic-type power steering unit that is powered with a hydraulic power unit (e.g., a hydraulic pump). In another example, the vehicle 10 can include an electro-hydraulic power unit having an electric power unit (e.g., an electric motor) that powers a hydraulic pump.

Figure 3:
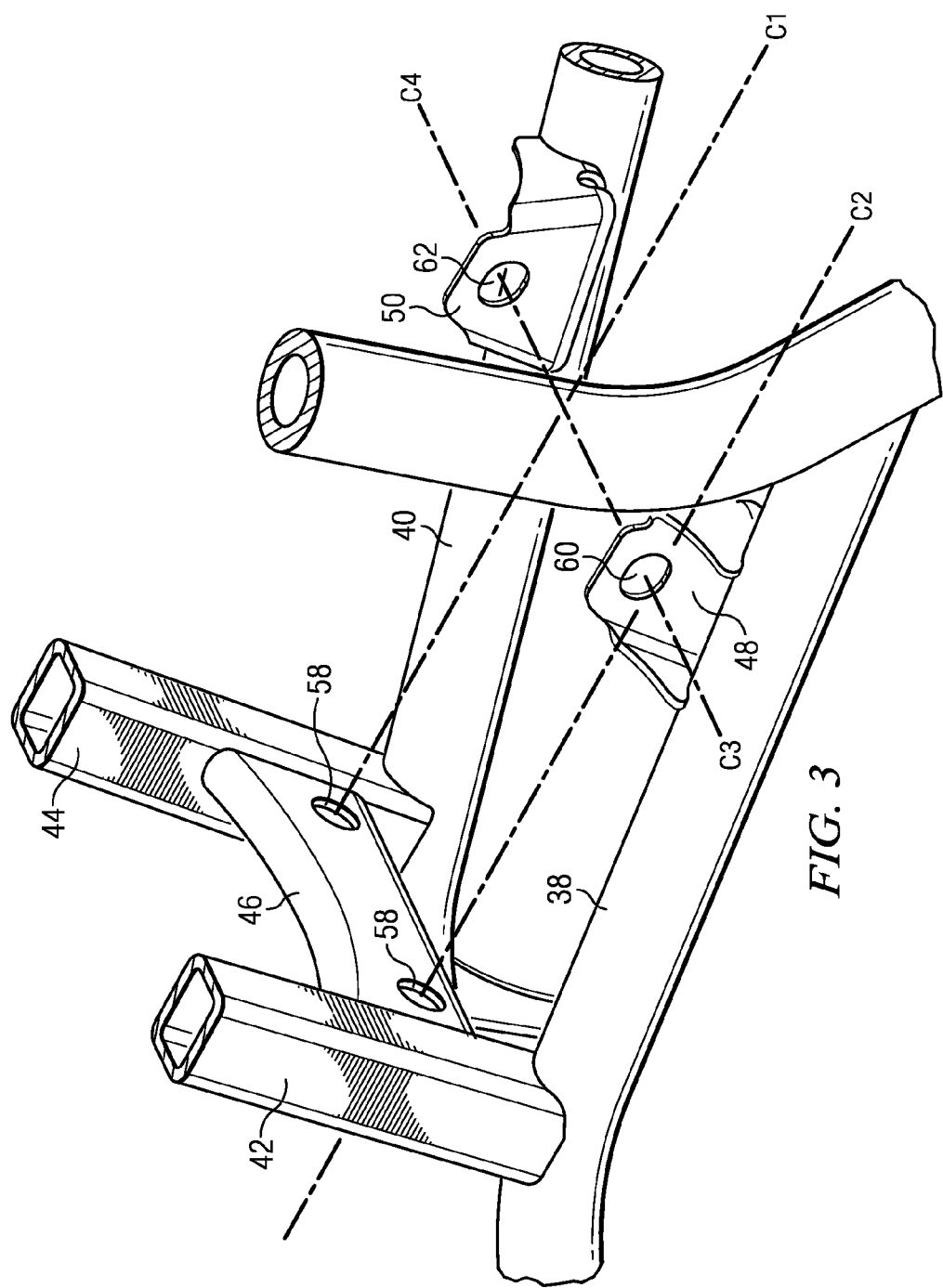
FIG. 3 is an enlarged rear perspective view depicting a steering mount assembly of the frame assembly of FIG. 2.

In one embodiment, as illustrated in FIGS. 2 and 3, the frame 14 can include a left lower member 38 and a right lower member 40 that are spaced from each other and extend in a substantially longitudinal direction. A left upright frame member 42 and a right upright frame member 44 can extend upwardly from the left and right lower members 38, 40, respectively. As illustrated in FIGS. 2 and 3, a lateral rib member 46 can extend between the left and right upright frame members 42, 44. In one embodiment, the lateral rib member 46 can be welded to the left and right upright frame members 42, 44. In another embodiment, the lateral rib member 46 and the left and right upright frame members 42, 44 can be formed together in a one-piece construction. Left and right bracket members 48, 50 can extend from the left and right lower members 38, 40, respectively. The left and right bracket members 48, 50 can be positioned rearwardly of and spaced from the lateral rib member 46 and the left and right upright frame members 42, 44, as shown in FIG. 3. In one embodiment, the left and right lower members 38, 40 can be welded to the end of the left and right upright frame members 42, 44, and to the end of the left and right bracket members 48, 50.

Figure 4:
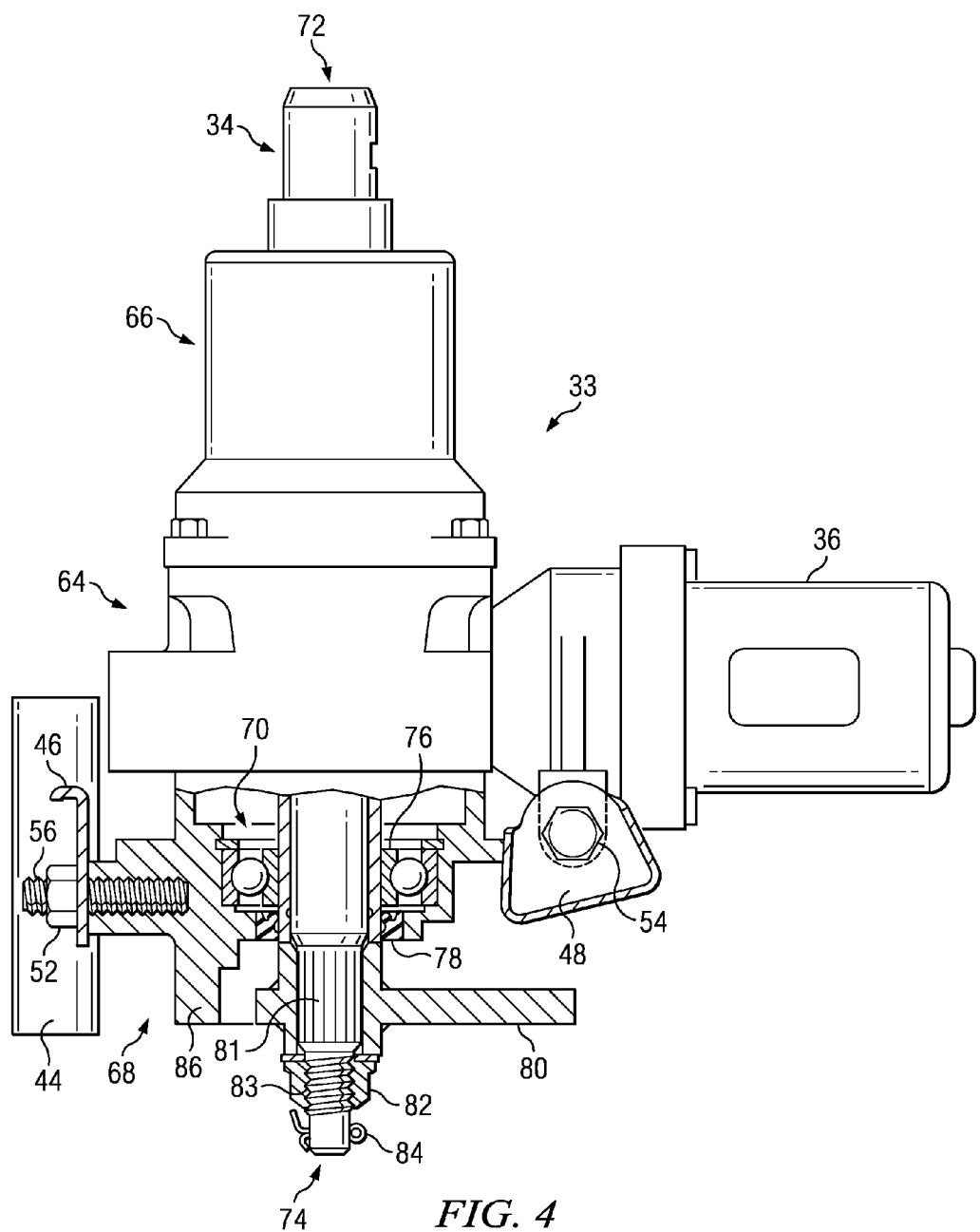
FIG. 4 is side view depicting an electronic steering unit coupled with a portion of the frame assembly, and with a lower portion of the electronic steering unit shown in cross-section and part of the frame assembly removed for clarity of illustration.
Figure 5:
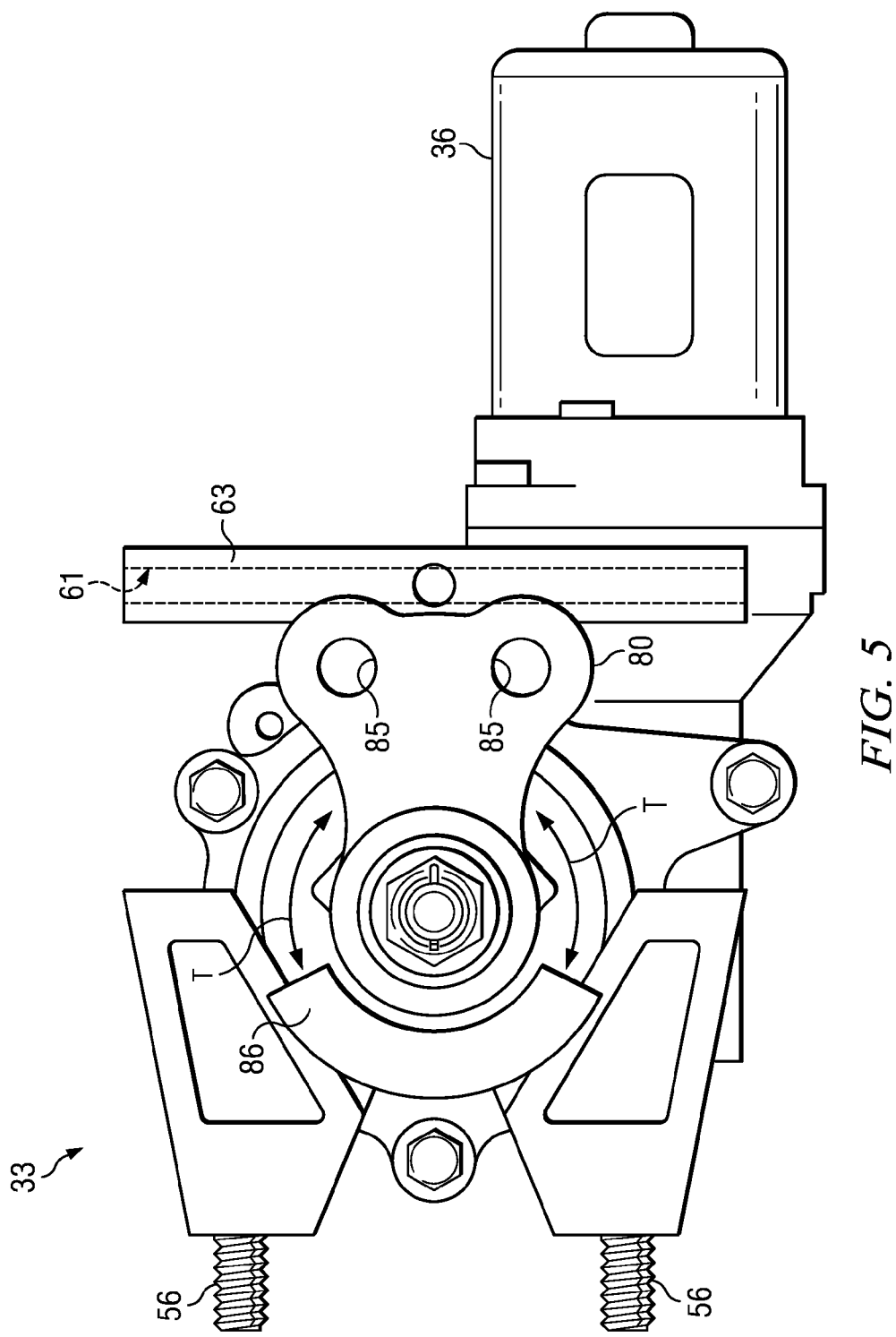
FIG. 5 is a bottom view depicting the electronic steering unit of FIG. 4 apart from the frame assembly.

The lateral rib member 46, the left bracket member 48, and the right bracket member 50 can cooperate with the head tube 26 to facilitate support of the steering assembly 18. As illustrated in FIG. 4, the EPS unit 33 can be releasably coupled to the lateral rib member 46 with nuts (e.g., 52) and releasably coupled to the left and right bracket members 48, 50 with a bolt 54 and a nut (not shown). More particularly, the EPS unit 33 can include a pair of threaded stems 56 that passes through respective mounting apertures 58 in the lateral rib member 46 and the nuts 52 can be threaded onto the respective threaded stems 56. The left and right bracket members 48, 50 can respectively define left and right mounting apertures 60, 62 for receiving the bolt 54. As illustrated in FIG. 5, a rear bracket 63 of the EPS unit 33 can define a passageway 61 configured to receive the bolt 54 for coupling the EPS unit 33 to the left and right bracket members 48, 50. One end of the passageway 61 can correspond with the left mounting aperture 60 and the other end of the passageway 61 can correspond with the right mounting aperture 62. A nut (not shown) can be threaded onto a threaded end (not shown) of the bolt 54. In one embodiment, the bolt 54 can be an M10 bolt which is about 160 mm long.

The arrangement of the lateral rib member 46 and the left and right bracket members 48, 50 can facilitate effective installation of the steering assembly 18 upon the frame 14. For example, when installing the steering assembly 18 on the frame 14, the threaded stems 56 can be inserted into the front mounting apertures 58 of the lateral rib member 46 to generally align the EPS unit 33. The EPS unit 33 can rest on the lateral rib member 46 while the nuts 52 are loosely threaded onto the respective threaded stems 56 to hold the steering assembly 18 in place. The EPS unit 33 can then be positioned until the passageway 61 (see FIG. 5) of the EPS unit 33 is aligned with the left and right mounting apertures 60, 62. The bolt 54 can then be provided through the left and right mounting apertures 60, 62 and the passageway 61 to hold the rear of the EPS unit 33 in place. The EPS unit 33 can then be finally aligned and the nuts 52 can be tightened and the nut can be tightened on the bolt to firmly secure the steering assembly 18 in place. Installation of the steering assembly 18 to the frame 14 in this manner can permit cost effective and time efficient installation and can reduce the need for additional materials (e.g., straps) and/or personnel to temporarily hold the steering unit 18 in place. It will be appreciated that the EPS unit 33 can be releasably coupled with a frame using any of a variety of fasteners or fastener arrangements.

The left and right lower members 38, 40 of the frame 14 can be spaced enough from each other and the left and right bracket members 48, 50 can be configured such that the EPS unit 33 is permitted during the installation process to pass between the left and right lower members 38, 40. The EPS unit 33 can accordingly be passed between the left and right lower frame members 38, 40 to permit the EPS unit 33 to be angled appropriately to allow insertion of the threaded stems 56 into the lateral rib member 46.

It will be appreciated that the arrangement of the front mounting apertures 58 with respect to the left and right mounting apertures 60, 62 can facilitate effective installation of the EPS unit 33 onto the frame 14. As illustrated in FIG. 3, the front mounting apertures 58 can define centerlines C1, C2 and the left and right mounting apertures 60, 62 can define respective centerlines C3, C4. The centerlines C3 and C4 can be parallel with each other, or collinear as shown in FIG. 3, and the centerlines C1, C2 can be substantially perpendicular to the centerlines C3, C4, as shown in FIG. 3. When the threaded stems 56 are inserted into the front mounting apertures 58, the EPS unit 33 can be pivoted with respect to the lateral rib member 46 until the rear bracket 63 is in alignment with the left and right mounting apertures 60, 62. With the left and right bracket members 48, 50 arranged such that the centerlines C3, C4 are substantially perpendicular to the centerlines C1, C2, the bolt 54 can be provided through a side of the EPS unit 33 (e.g., through the passageway 61), as opposed to the rear of the EPS unit 33, which can permit an installer to access the threaded stems 56 and the bolt 54 or nut from the front of the vehicle 10 and without excessive reaching or repositioning to the rear of the EPS unit 33.

As illustrated in FIG. 4, the EPS unit 33 can include a housing 64 having an upper portion 66 and a lower portion 68. The upper portion 66 can be bolted to the lower portion 68 and can cooperate with the lower portion 68 to define an interior 70. The steering shaft 34 can include an upper end 72 and a lower end 74 and can extend into the interior 70. The electric motor 36 can be associated with the housing 64 and can extend at least partially into the interior 70 to interact with the steering shaft 34. A bearing 76 can be supported by (e.g., pressed into) the lower portion 68 of the housing 64 such that the bearing 76 is at least partially disposed within the interior 70. The lower end 74 of the steering shaft 34 can be journaled with respect to the lower portion 68 by the bearing 76. The lower end 74 of the steering shaft 34 can extend through the bearing 76 and, in one embodiment, can include a tapered surface that engages the bearing 76 in an interference fit. The upper end 72 of the steering shaft 34 can be journaled with respect to the upper portion 66 of the housing 64 in a similar manner such that the entire steering shaft 34 is rotatable with respect to the housing 64.

In one embodiment, as illustrated in FIG. 4, the bearing 76 can be disposed entirely within the interior 70 such that it is contained entirely within the housing 64. An oil seal 78 can underlie the bearing 76 and can be effective to seal off the bearing 76 and the interior 70 from exposure to external conditions (e.g., dirt, dust, or fluid) thereby increasing the lifespan of the bearing 76 and reducing the maintenance and/or replacement intervals.

Figure 7:
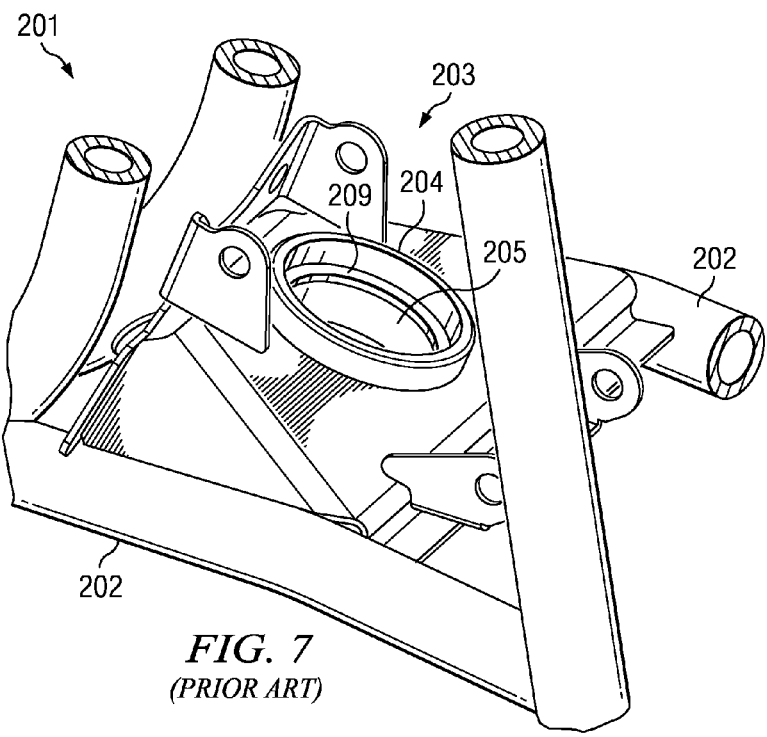
FIG. 7 is an upper perspective view depicting a front portion of a prior art frame arrangement.
Figure 8:
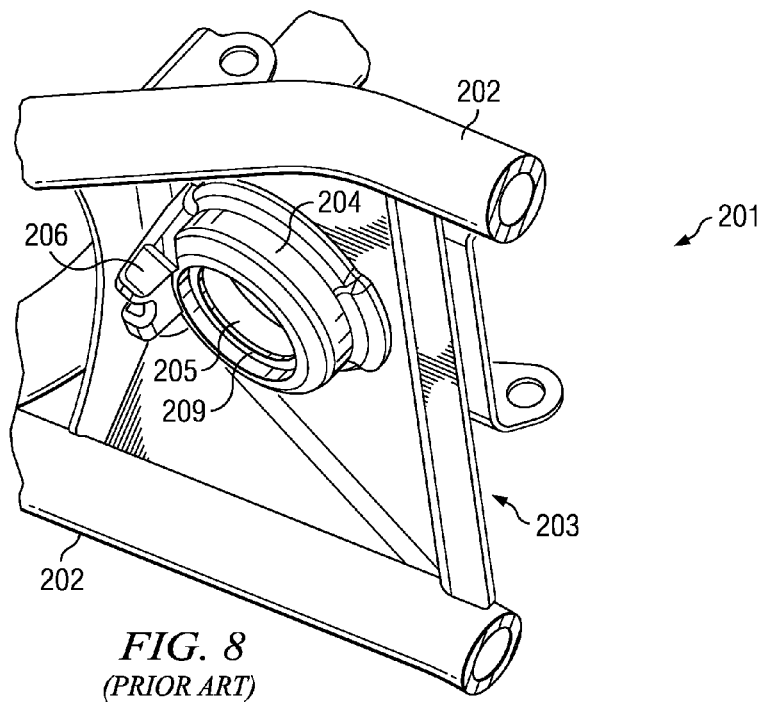
FIG. 8 is a lower perspective view depicting the prior art frame arrangement of FIG. 7.

The EPS unit 33, in conjunction with the arrangement of the frame 14 (e.g., the lateral rib member 46 and the left and right bracket members 48, 50), can have certain advantages over conventional power steering units and conventional frame arrangements. A conventional frame arrangement 201 is illustrated in FIGS. 7 and 8. The conventional frame arrangement 201 includes a pair of lateral frame members 202. A power steering unit mounting plate 203 is attached to the lateral frame members 202 and supports a power steering unit (not shown). The power steering unit mounting plate 203 includes a support collar 204 that is configured to receive a steering shaft from the power steering unit. Before the power steering unit is installed, a bearing 205 must be pressed into the support collar 204 such as with a hydraulic press or through manual means (e.g., with a hammer). Pressing the bearing 205 into the support collar 204 can be inexact, time consuming, and can sometimes damage the support collar 204 and/or bearing 205. During installation of the steering shaft and associated power steering unit onto the power steering unit mounting plate 203, the bearing 205 and/or oil seals 209 associated with the bearing 205 are susceptible to enduring damaging contact with the steering shaft.

Conversely, with regard to the EPS unit 33 of FIGS. 1-5, the bearing 76 can be installed into the lower portion 68 of the housing 64 during assembly of the EPS unit 33 using automated equipment and/or processes. This automated equipment and/or processes can be more precise than manual installation, and the bearing 76 can accordingly be less prone to being damaged. Since the bearing 76 can be contained within the interior 70 of the housing 64, as described above, the bearing 76 is also less susceptible to being damaged or contaminated during installation of the EPS unit 33 onto the frame 14. Moreover, since the bearing 76 is contained within the housing 64 and thus rotatably supports the lower end 74 of the steering shaft 34 with respect to the housing 64, in some embodiments the bearing 76 can be the lowermost bearing supported on the steering shaft 34. Additional external frame mounted bearings for supporting the power steering unit, such as bearing 205 of FIGS. 7 and 8, can be omitted, which can be more cost effective and time efficient.

As illustrated in FIGS. 4 and 5, the EPS unit 33 can include a steering arm 80 that is coupled with the lower end 74 of steering shaft 34 and is configured for coupling to the front wheels 22. In one embodiment, as illustrated in FIG. 4, the lower end 74 can include a splined shaft 81 such that the steering arm 80 can be splined to the lower end 74. The lower end 74 of the steering shaft 34 can extend beyond the steering arm 80 and can also include a threaded portion 83. A nut 82 can be threaded onto the threaded portion 83 of the lower end 74 to retain the steering arm 80 on the lower end 74. In one embodiment, a cotter pin 84 can be provided through an aperture in the lower end 74 below the nut 82 to prevent the nut 82 from inadvertently loosening. A retention clip can additionally or alternatively be provided.

As illustrated in FIG. 5, the steering arm 80 can define a pair of apertures 85 that are configured to receive respective tie rods (not shown). The tie rods can be linked to the front wheels 22 to facilitate turning of the front wheels 22 with the steering arm 80. The steering arm 80 can be pivoted through operation of the handlebars 22. As illustrated in FIG. 5, the steering arm 80 can be movable along a travel path T when the handlebars 20 are pivoted. As illustrated in FIGS. 4 and 5, the EPS unit 33 can include a stop portion 86 that projects from the lower portion 68 of the housing 64 and into the travel path T of the steering arm 80. When the handlebars are pivoted 22, the steering arm 80 can selectively contact the stop portion 86 to prevent complete rotation of the steering shaft 34. The stop portion 80 can therefore prevent the steering shaft 34 from over rotating and possibly damaging the steering assembly 18, the steering linkage (e.g., tie rods), and/or the EPS unit 33.

As illustrated in FIG. 4, the lower portion 68 of the housing 64 and the stop portion 86 can be formed together in a one-piece construction. In one embodiment, the stop portion 86 can be cast together with the lower portion 68 (e.g., as part of a casting process). In such an embodiment, a castable material, such as cast aluminum, cast iron, a catalyst-activated resin, or thermoplastic, for example, can be provided into a mold and cured to form the lower portion 68 and the stop portion 86 together as a one-piece construction. It will be appreciated that the lower portion 68 and the stop portion 86 can be formed from any of a variety of suitable alternative materials and/or processes that achieve a one-piece construction.

With the stop portion 86 provided as part of the EPS unit 33, as shown in FIG. 4, the steering arm 80 can be provided onto the lower end 74 of the steering shaft 34 prior to installation of the EPS unit 33 on the frame 14. The EPS unit 33 can accordingly be installed on the frame 14 as an assembled unit which can be more cost effective and efficient than the installation of some conventional power steering units. For example, as illustrated in FIGS. 7 and 8, the conventional frame arrangement 201 includes a stopper arm 206. When the power steering unit is installed on the frame, the steering shaft must first be provided through the support collar 204 without a steering arm. Once the conventional power steering unit is in place, the steering arm is then secured to the steering shaft with a cotter pin, nut, or the like. Separate installation of the steering arm in this manner can lead to the steering arm, cotter, pin and/or nut being misplaced and/or damaged. In addition, installation of the steering arm onto the steering shaft can require access to areas beneath the frame which can be difficult, time consuming, and might require excessive handling of the conventional frame arrangement (e.g., to turn the frame assembly upside-down). Instead, with respect to the embodiment shown in FIGS. 1-5, since the EPS unit 33 can be installed on the frame 14 with the steering arm 80 already in place, the steering arm 80, nut 82, and/or cotter pin 84 might be less prone to being misplaced and/or damaged. Furthermore, the need to access to areas beneath the frame can be reduced which can permit more cost effective and time efficient installation of the EPS unit 33.

In some instances, the EPS unit 33 can be distributed from a third party distributor/manufacturer (e.g., from a parts warehouse or an auto parts distributor) with the steering arm 80 installed such that the EPS unit 33 is ready for installation from the distributor/manufacturer. The EPS unit 33 can accordingly be retrieved directly from an installer's inventory and attached to the support shaft 24 and to the frame 14 without significant handling or pre-installation assembly.

Figure 6:
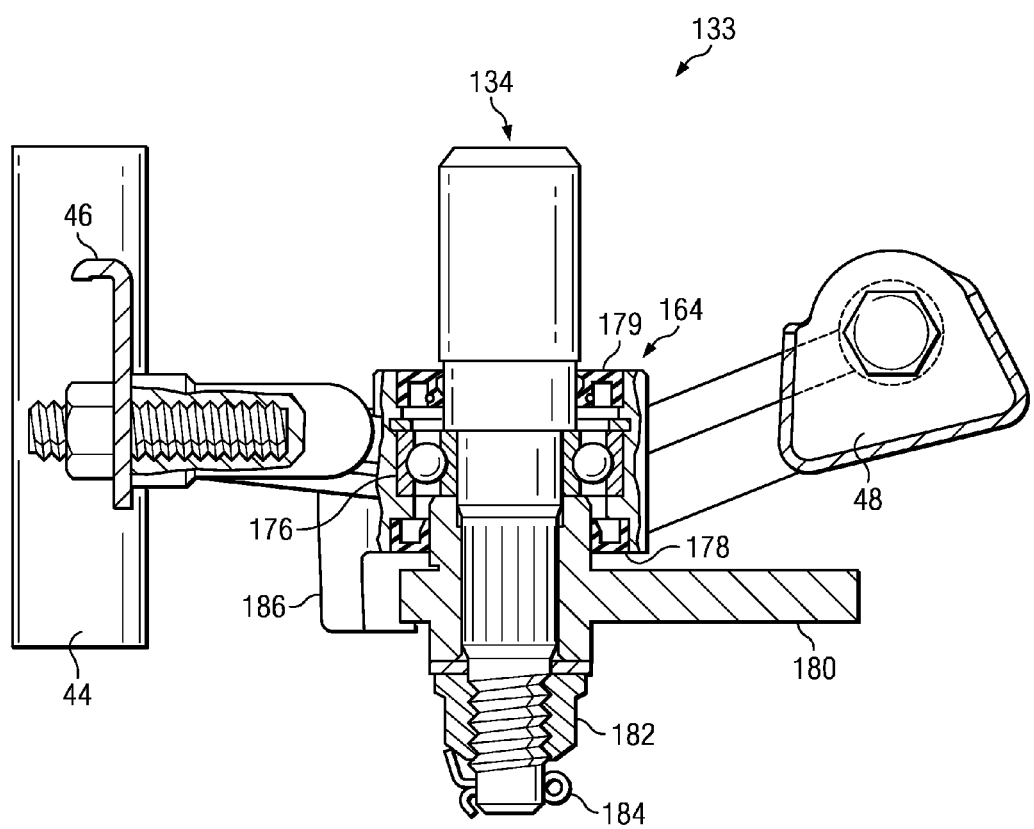
FIG. 6 is side view depicting a steering unit coupled with a portion of the frame assembly and with a lower portion of a non-power steering unit shown in cross-section.

Referring now to FIG. 6, a non-power steering unit 133 can be provided in lieu of the EPS unit 33 or other power steering unit. The non-power steering unit 133 can provide a non-powered link (e.g., no assistive torque from a power unit) between the support shaft 24 and the front wheels 22. The non-power steering unit 133 can include a steering shaft 134 that can be coupled to the support shaft 24. A housing 164 can support a bearing 176 and the steering shaft 134 can be journaled with respect to the housing 164 by the bearing 176. The bearing 176 can be sandwiched between respective oil seals 178, 179 that cooperate to seal off the bearing 176 from exposure to external conditions (e.g., dirt, dust, or fluid). The non-power steering unit 133 can be coupled with the lateral rib member 46, the left bracket member 48, and the right bracket member (50, not shown in FIG. 6) in a similar manner as the EPS unit 33 described above and shown in FIGS. 1-5.

The non-power steering unit 133 can include a steering arm 180 and a stop portion 186 that is similar in many respects to the steering arm 80 and the stop portion 86 illustrated in FIGS. 4 and 5. For example, the steering arm 180 can be splined to the steering shaft 134 and releasably secured with a nut 182 and a cotter pin 184. The steering arm 180 can be movable along a travel path (not shown) when the handlebars 20 are pivoted. The stop portion 186 can project into the travel path of the steering arm 180. When the handlebars 20 are pivoted, the steering arm 180 can selectively contact the stop portion 186 to prevent over-rotation of the steering shaft 134. The housing 164 and the stop portion 186 can be formed together in a one-piece construction.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A steering unit comprising:
   a housing including an upper portion and a lower portion that cooperate to define an interior, the housing being configured for releasable attachment to a frame of a vehicle;
   a steering shaft having an upper end and a lower end and extending into the interior of the housing;
   a bearing supported by the lower portion of the housing and disposed at least partially within the interior of the housing, the steering shaft being journaled with respect to the lower portion of the housing by the bearing such that the steering shaft is rotatable with respect to the housing;
   a steering arm coupled with the lower end of the steering shaft and configured for coupling to steerable wheels, the steering arm being movable along a travel path; and
   a stop portion that projects from the lower portion of the housing and into the travel path of the steering arm such that the steering arm selectively contacts the stop portion to prevent over-rotation of the steering shaft; and
   a power unit attached to, and extending away from, the lower portion of the housing and configured for providing assistive torque to the steering shaft; wherein
   the lower portion of the housing and the stop portion are formed together in a one-piece construction.

2. The steering unit of claim 1 wherein the bearing is the lowermost bearing supported on the steering shaft.

3. The steering unit of claim 1 wherein the lower end of the steering shaft extends beyond the stop portion.

4. The steering unit of claim 1 wherein the steering arm is splined to the lower end of the steering shaft.

5. The steering unit of claim 1 wherein the power unit comprises an electric motor.

6. The steering unit of claim 1 further comprising a pair of threaded stems extending from the housing and configured to support the steering unit with respect to a frame.

7. The steering unit of claim 6 wherein the housing defines a passageway configured to receive respective fasteners for releasably attaching the housing to a frame.

8. A vehicular frame assembly comprising:
   a left lower frame member extending in a substantially longitudinal direction;
   a right lower frame member spaced from the left lower frame member and extending in a substantially longitudinal direction;
   a left upright frame member attached to and extending upwardly from the left lower frame member;
   a right upright frame member attached to and extending upwardly from the right lower frame member;
   a lateral rib member in contacting engagement with each one of, and extending between, the left upright frame member and the right upright frame member, the lateral rib member defining at least one front mounting aperture configured for receipt of a fastener that facilitates releasable coupling of a steering unit to the lateral rib member, the at least one front mounting aperture defining a first centerline;
   a left bracket member that extends from the left lower frame member and defines a left mounting aperture that defines a second centerline; and
   a right bracket member that extends from the right lower frame member and is spaced from the left bracket member, the right bracket member defining a right mounting aperture that defines a third centerline;
   wherein the first centerline is substantially perpendicular to at least one of the second centerline and the third centerline.

9. The vehicular frame assembly of claim 8 wherein the left bracket member and the right bracket member are arranged such that the second centerline and the third centerline are collinear.

10. The vehicular frame assembly of claim 8 wherein:
the left lower frame member and the right lower frame member are spaced apart enough to permit passage of a power steering unit; and
the lateral rib member is welded to each of the left upright frame member and the right upright frame member.

11. The vehicular frame assembly of claim 8 further comprising a head tube that cooperates with the lateral rib member, the left bracket member, and the right bracket member to facilitate support of a steering assembly.

\* \* \* \* \*